R. POLLAK.
GUARD.
APPLICATION FILED AUG. 19, 1908.

967,971.

Patented Aug. 23, 1910.
2 SHEETS—SHEET 1.

WITNESSES:

INVENTOR
Richard Pollak.
BY
ATTORNEYS

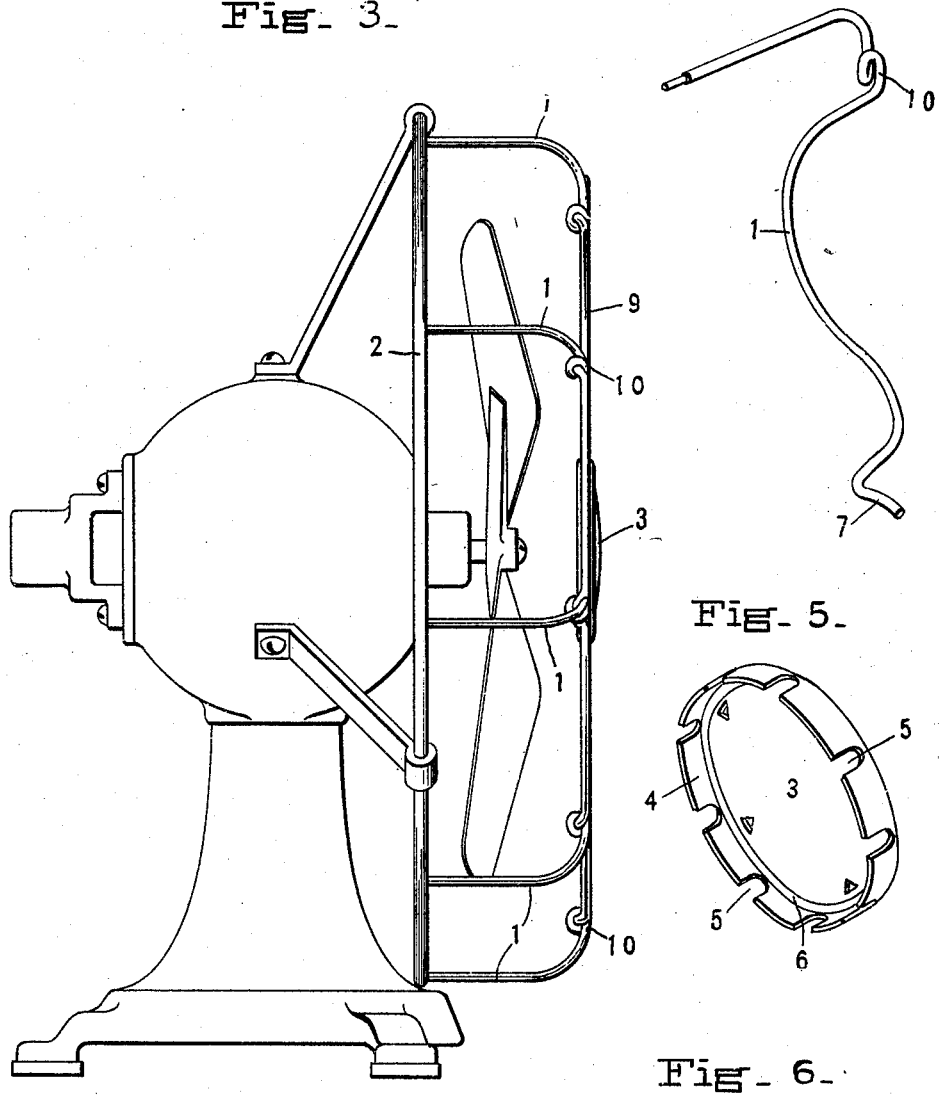

UNITED STATES PATENT OFFICE.

RICHARD POLLAK, OF NEWARK, NEW JERSEY, ASSIGNOR TO ECK DYNAMO AND MOTOR COMPANY, A CORPORATION OF NEW JERSEY.

GUARD.

967,971.  Specification of Letters Patent.  Patented Aug. 23, 1910.

Application filed August 19, 1908. Serial No. 449,246.

*To all whom it may concern:*

Be it known that I, RICHARD POLLAK, subject of the Emperor of Austria-Hungary, and resident of Newark, in the county of Essex and State of New Jersey, have invented certain new and useful Improvements in Guards, of which the following is a specification.

My invention relates to improvements in guards, and in particular to guards for electric fans, blowers and the like devices.

The object of my invention is the provision of a device of this character of light and simple construction which will be inexpensive of production and which will be strong and rigidly made. To accomplish these ends, I preferably employ a series of guard wires having their outer ends connected together by a ring member or secured together in any other suitable manner and having their inner ends connected by an annular union member. This annular union or securing member will preferably take the form of a disk made of sheet material having an annular groove therein and a circumferential flange, the flange having openings to receive the inner portions of the wires, the inner ends of the wires being bent circumferentially to lie in the annular groove, in the member and the circumferential flange being bent over to lock the ends of the wires in the groove. The so called annular member might be of circular shape in the form of a ring, polygonal or of any other symmetrical or irregular shape. For larger sizes, rods would probably be used in place of wires, so the word "wires" is meant to include as well, rods or other like elements.

The preferred form of the invention is illustrated in the accompanying drawings, but of course changes might be made in the construction and arrangement of the parts, such as come within the intended scope of the claims.

Figure 1:
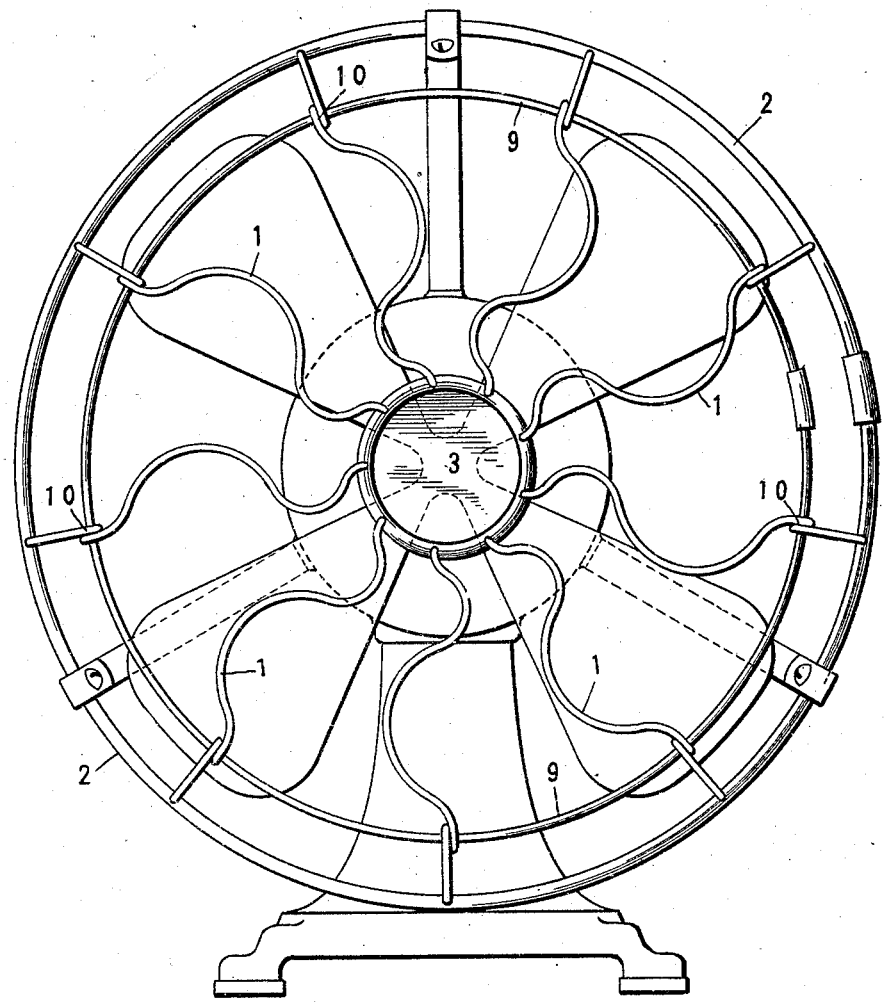
Figure 2:
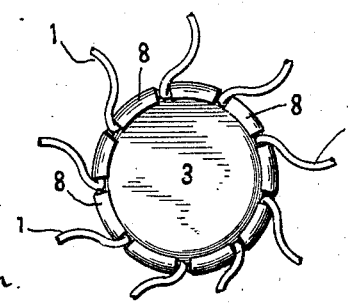

In said drawings: Figure 1, is a face view of the guard as applied to an ordinary electric fan. Fig. 2, is a broken detail view taken from the inner side of the union or securing member, showing how the inner ends of the guard wires are secured thereto. Fig. 3, is an edge view of the guard as applied to the fan motor. Fig. 4, is a detached perspective view of one of the guard wires. Fig. 5, is a like view of the annular securing member for the inner ends of the guard wires, before the wires have been connected therewith. Fig. 6, is a broken detail view showing the mode of connection between the guard wires and annular member before the confining flange of the annular member has been bent to place. Fig. 7, is a sectional view of the same taken on the line 7—7 of Fig. 6. Fig. 8, is a broken detail view to illustrate the connection between the guard wires and the bracing or ring member for holding the outer portion of the guard wires properly spaced.

Like characters of reference denote similar parts throughout the several views.

The guard wires 1, may be straight, curved or of any desired shape, the drawings illustrating a conventional way of shaping the guard wires for a small fan. The outer ends of the guard wires are usually connected together by a ring like member 2, though they might be otherwise secured. When so connected, the ends of the guard wires would be riveted, soldered, or otherwise fastened to this connecting or securing member. The inner ends of the wires are connected by a union member, which is preferably in the form of a disk 3, and made of sheet material. This disk or annular member has a confining flange 4, provided with slots or openings 5, through which the inner portions of the guard wires extend, and is further provided with an annular groove 6, to receive the inner ends of the guard wires, the wires being bent circumferentially as at 7, so as to lie in the groove. After the inner ends of the wires are seated in the groove, the confining flange is bent over the circumferential portions of the wires, as at 8, in Fig. 2, thereby locking the inner ends of the wires together. Besides serving as a connection for the inner ends of the wires, this union member acts as a brace materially adding to the strength and rigidity of the guard. This annular connection member might simply be in the form of a ring, or it could be of any shape.

In order to hold the intermediate portions of the guard wires properly spaced, a spacing member or ring 9, is usually employed, around which the guard wires are wrapped as shown at 10, in Fig. 8.

What is claimed, is:

1. In a guard, guard wires, means connecting the outer ends of the wires, and means connecting the inner ends of the guard wires comprising an annular member having a confining flange embracing the guard wires, the said guard wires extending substantially radially into the said annular member and bent so as to run substantially circumferentially.

2. In a guard, guard wires, means connecting the outer ends of the wires, and means connecting the inner ends of the guard wires comprising an annular member having a circumferential groove and a confining flange, the said guard wires extending substantially radially into the said annular member and being bent so as to lie in the circumferential groove, the flange being bent over the ends of the wires so as to confine them in the groove aforesaid.

3. In a guard, guard wires, means securing the outer ends of the wires, and means securing the inner ends of the wires comprising an annular member having a groove and a circumferential flange provided with openings through which the wires extend, said wires being bent so as to lie in the groove aforesaid, and the said flange being bent so as to confine the wires in the groove.

4. In a guard, guard wires, means connecting the outer ends of the wires, and means connecting the inner ends of the wires comprising a member having a confining flange slotted to receive the radial portions of the wires, and said confining flange being bent over the inner end portions of the wires.

Signed at Belleville in the county of Essex and State of New Jersey this 15th day of August A. D. 1908.

RICHARD POLLAK.

Witnesses:
JOHN J. CONNELL,
J. SMYLIE KINNEY.